March 8, 1960 M. G. KROGER 2,927,958

TELEVISION RECEIVER

Filed Nov. 5, 1957

Inventor
Marlin G. Kroger
By Mueller & Aichele
Attys.

United States Patent Office 2,927,958 Patented Mar. 8, 1960

2,927,958

TELEVISION RECEIVER

Marlin G. Kroger, Elmhurst, Ill., assignor to Motorola, Inc., Chicago, Ill., a corporation of Illinois Application November 5, 1957, Serial No. 694,572

6 Claims. (Cl. 178—5.4)

Figures 1, 2:
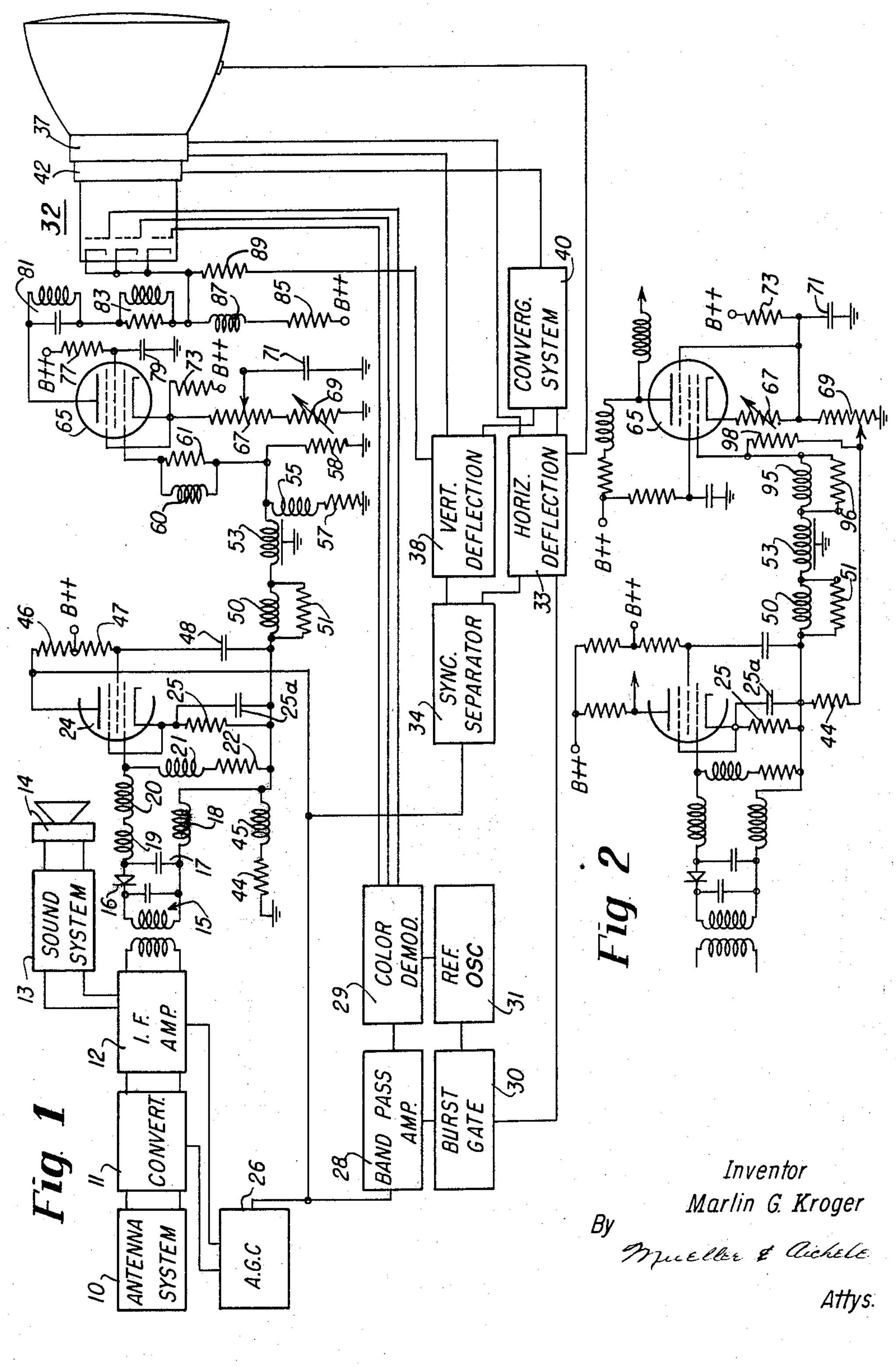

This invention relates to television receivers and more particularly to video amplifiers and associated brightness and contrast controls as used in such receivers.

In present day television receivers it is often found necessary to apply to the picture tube both the alternating current and the direct current information of the received video signal. The alternating current components represent the elemental shade variations in a scene and the direct current components represent the overall scene brightness level, and should be utilized for accurate scene reproduction as the average picture content varies. In color television receivers the direct current components of the video signal may additionally be necessary to provide proper color rendition, and therefore, it is increasingly important to have direct current coupling from the video signal detector to the cathode ray tube in a color television receiver in order to preserve the direct current components of the video signal information.

Color receivers often use two direct current coupled video amplifier stages with the second stage direct current coupled to the cathode ray tube so that the direct current information of the video signal is applied to the picture tube, thus improving proper color rendition and promoting a proper presentation of each scene according to its average brightness level. Since the current in the second video amplifier in such a system also supplies the cathode ray beam current, which establishes the picture brightness, and the signal level in the second video amplifier establishes the variation of the video signal applied to the cathode ray tube, both brightness and contrast controls can be incorporated in the second video amplifier.

While the aforementioned direct current components of the video information should be applied to the cathode ray tube under most conditions, with present day cathode ray tubes which are generally operated at or near their highest brightness, it may be desirable to reduce the percentage of the direct current video components applied to the cathode ray tube at the higher contrast control settings. This is because an adjustment to a high contrast setting, or increased drive of the picture tube, together with high brightness setting, while receiving a scene of average brightness, can result in drawing excess beam current in the cathode ray tube and thereby exceeding the normal operational range of the high-voltage regulator if a brighter scene is later received and displayed. Under such conditions, the ensuing effects will cause a loss of high voltage regulation and deterioration of focus and beam convergence as well as a blooming effect, or condition of oversized picture. Therefore, direct current restoration, or preservation, may be undesirable at high contrast settings and desirable at lower contrast settings in a color television receiver.

Accordingly, an object of this invention is to provide a contrast controlling circuit for a color television receiver wherein a high percentage of the direct current video components are applied to the cathode ray tube at low contrast settings and wherein a small percentage of the direct current video components are applied to the tube at higher contrast settings, thereby reducing the tendency for picture deterioration when scene brightness is increased after the contrast and brightness controls of the receiver have been established at high level settings.

In the aforementioned two-stage video amplifiers as frequently used in color television receivers, the video signals applied from the first stage to the second stage are generally established at an absolute direct current level which is above the ground or reference point in the entire receiver, due to the quiescent conduction of the first tube of the amplifier. Therefore, some provision must be made in the circuitry of the second video amplifier to offset such direct current level for proper biasing conditions of the second video amplifier tube in relation to the power supply voltages available for energization of that tube.

Accordingly, another object of the invention is to provide a two-stage direct current coupled video amplifier for a television receiver wherein suitable contrast and brightness controls are incorporated in an improved bias circuit for the second video amplifier which may utilize a conventional power supply and which does not require a special negative bias source.

Another object is to provide a simple and inexpensive bias circuit for the second vacuum tube amplifier in a two-stage video amplifier for a color television receiver.

A feature of the invention is the provision of an improved video amplifier including a vacuum tube having variable resistor control means in the cathode circuit thereof with an adjustable portion of the resistor means bypassed for video signals so that the alternating current video components may be applied to the amplifier tube under variable degenerative conditions thereby effecting variation of the percentage direct current coupling of video signals in indirect proportion to the contrast control setting, or level of the video signals derived from the output of this amplifier tube.

Another feature of the invention is the provision of a two-stage direct current coupled video amplifier system utilizing a voltage divider in the cathode circuit of the second amplifier tube, with two adjustable portions of the divider, one having a variable impedance at the frequencies of the video signal components, and the other having essentially zero impedance at the frequencies of the video components but significant impedance for the quiescent current of the second amplifier tube, thus providing an adjustment for both picture contrast and brightness in the cathode ray tube driven by such an amplifier system.

In brief, the invention provides a video amplifier system especially adapted for use in a color television receiver. A first video amplifier stage is direct-current coupled to the video signal detector and the output thereof is applied between the control grid and cathode of a tube in the second video amplifier stage. The second tube is direct current coupled to the cathode ray tube so that the video system can apply both alternating current and direct current components of the video information to the cathode ray tube. Since the signal from the first stage is at a direct current level with respect to the power supply reference point, or ground, due to the average conduction of this tube, a bias network for the second video amplifier tube must account for such level of the video signal. In the improved circuit of this invention a voltage divider between ground and a positive potential, obtained from a conventional power supply in the receiver, is connected to the cathode of the second tube for biasing thereof. The voltage divider includes a variable portion bypassed for video frequencies so that the average current of the second amplifier tube can be regulated, thus changing beam current in the cathode ray tube, or brightness. Also, there is a variable portion of the voltage divider which has appreciable impedance at video frequencies and this provides video signal level control or contrast adjustment of the reproduced picture. The contrast control may also include a variable signal bypass provision for video frequencies so that it can degenerate video signals by a greater amount at low contrast settings and by a lesser amount at high contrast settings, thereby effectively changing the percentage of direct current coupling of the video signal components so that this percentage is low at high contrast settings and high at low contrast settings in order to avoid the aforementioned defects in drawing excess beam current in a color television receiver.

Fig. 1 shows a block diagram of a color television receiver in conjunction with which the video amplifier system of the present invention may be used. A television signal is received by the antenna system 10 and coupled to a signal frequency converter 11 which provides a fixed frequency signal for the intermediate frequency amplifier 12. The signal from amplifier 12 is applied to the sound system 13 which includes a sound detector and suitable audio frequency amplifiers to drive loudspeaker 14 with the audio components of the received television signal. The amplifier 12 is also connected through tranformer 15 to the diode detector 16 to derive the modulation envelope of the video signal components of the received signal. The detected signal appears across capacitor 17 and is applied through chokes 18 and 19 and peaking coil 20 across the series combination of peaking coil 21 and resistor 22. The control grid of the first video amplifier tube 24 is connected to the junction of peaking coils 20, 21, and the cathode of this tube is connected through the parallel combination of cathode bias resistor 25 and bypass capacitor 25*a* to the bottom of resistor 22. The first video amplifier provides a portion of the detected video signal from the anode of tube 24 which is applied to the automatic gain control circuit 26 which provides a gain control potential to the converter 11 and the intermediate frequency amplifier 12. The detected video signal is also applied to the bandpass amplifier 28 which applies the signal to the color demodulator 29 and the burst gate 30. The burst gate provides a signal of the color reference frequency, obtained from the received video signal, to the reference oscillator 31, a signal from which is utilized in the color demodulator 29. Three output signals from the demodulator 29 are applied to individual grids of the tri-beam cathode ray tube 32 in order that a composite color picture may be formed thereby. The circuits 26, 28, 29, 30 and 31 are all shown generally in Fig. 1 and may be of known construction.

The burst gate 30 is also connected to the horizontal deflection system 33 to be triggered by a signal therefrom and a portion of the output signal from the first video amplifier is applied to the synchronizing signal separator 34 which is also connected to the horizontal deflection system 33. The system 33 provides suitable sawtooth signals for the deflection yoke 37 for horizontal sweep of the cathode ray beams as well as high voltage for the anode of cathode ray tube 32. This high voltage may be regulated by circuitry known in the art. The synchronizing signal separator 34 is further connected to the vertical deflection system 38 which provides vertical sweep signals for the yoke 37. Both horizontal and vertical deflection systems are connected to the convergence system 40 which furnishes suitable signals for operating the beam convergence field producing apparatus 42 which is mounted on the neck of the cathode ray tube. The beam sweep system as described generally herein may also be of construction which is known in the art.

Considering again the video amplifier system, anode current for tube 24 flows through resistor 44, peaking coil 45 and components 25, 25*a* and plate isolating resistor 46 to B++. The screen potential is provided for tube 24 through the isolating resistor 47 which is connected to B++ and the screen is bypassed to the cathode through capacitor 48 and the cathode bypass capacitor 25*a*. As is conventional in such receivers, B++ is bypassed in the power supply which furnishes this potential so that it has a low impedance with respect to ground, or the reference point, and resistor 46 has a low impedance compared to that of resistor 44 and coil 45 so that part of the output from the first video amplifier may be derived across the series combination of resistor 44 and coil 45. It may be noted that this output signal will retain the direct current components of the video information since tube 24 is direct current coupled to the diode 16, or video detector, and that the output signal will be referenced with respect to ground.

The output signals from the first video amplifier are applied through the parallel combination of peaking coil 50 and resistor 51 and the delay line 53 across the series connections of choke 55 and the resistor 57. The delay line 53 serves to delay the brightness video signals so that they will be in properly timed relation with respect to the color information which is supplied to the control grids of the cathode ray tube 32. Signal losses involved in the delay line 53 are compensated by the use of two video amplifier stages.

The input to the second video amplifier stage is applied from the junction of delay line 53 and choke 55 through the parallel combination of peaking coil 60 and resistor 61 to the control grid of the vacuum tube 65. The cathode of tube 65 is connected to ground for direct current conduction through the series connection of variable resistors 67 and 69. The movable arm of resistor 67 is connected to ground through a bypass capacitor 71 and the cathode of tube 65 is further connected to B++ through voltage divider resistor 73. The detailed operation of the cathode circuit of tube 65 will be described subsequently.

The screen grid of tube 65 is energized from B++ through isolating resistor 77 and is bypassed to ground through capacitor 79. The video signals amplified by tube 65 are applied through the parallel connected inductor capacitor circuit 81, the parallel connected resistor inductor circuit 83 to the three cathodes of the tri-beam cathode ray tube. The anode of this tube is energized from B++ through the resistor 85, choke 87 and circuit 81, 83. A retrace blanking pulse from the vertical deflection system 38 is also applied to the three cathodes of the tube 30 through resistor 89. It may be noted that the output signal from the first video amplifier tube 24 will be at a certain positive direct current level (with respect to ground) due to the conduction of tube 24 through resistor 44 and choke 45. Since the junction of choke 45 and resistor 22 is direct current connected to the grid of second video amplifier tube 65 it is necessary to raise the cathode potential of tube 65 in order to have proper biasing of this tube. Accordingly, a voltage divider is formed between ground and B++ by the series connection of variable resistor 69, variable resistor 67 and fixed resistor 73.

Furthermore, it is apparent that the beam current of the tri-beam cathode ray tube 32 is drawn through the cathode circuit of tube 65 and that adjustment of resistor 69 will vary the cathode bias of tube 65 thereby changing the direct current conduction thereof and the beam current in the cathode ray tube. Resistor 69 therefore provides brightness control for the television receiver.

The movable arm of variable resistor 67 is connected to ground through bypass capacitor 71 which is large enough to have negligible reactance at the frequencies of the video signals. Accordingly, moving the arm of resistor 67 will bypass different amounts of the alternating current components of the video signals to introduce a variable amount of degeneration of them, with maximum degeneration of the A.C. video input signal occurring when the arm of resistor 67 is at the bottom and minimum degeneration occurring when the movable arm is at the top of this resistor. The result of varying the arm resistor 67 therefore is to alter the effective signal drive of tube 65 for the alternating current components of the video signal. Accordingly, resistor 67 provides a signal level control for the signals driving cathode ray tube 32 and it controls the contrast of the picture produced by this tube.

Variation of the arm of resistor 67 has no effect on the direct current conduction of tube 65, and therefore, the direct current components of the video signal will not be affected thereby. However, since the alternating current component thereof is changed, the effective percentage of direct current coupling, that is, the ratio of direct current component to alternating current component of the video signal is changed, with different settings of this resistor. With the movable arm of resistor 67 adjusted near the top of this resistor, the video signal level will be high, and the contrast maximum, while at the same time the direct current coupling will be at a low percentage. Conversely with the movable arm of resistor 67 positioned near the bottom thereof, the contrast will be lower and the direct current coupling percentage will be higher. As previously indicated herein, this is desirable because a setting of high brightness level and high contrast level for a scene of normal brightness can permit excessive beam current conduction in the cathode ray tube when a scene of greater brightness is being reproduced. The excess beam conduction can cause deterioration of the high voltage regulation provided in the circuitry of the horizontal deflection system, as is conventional in television receivers, and a loss of beam convergence, focus of the image, and increase in the picture size, all of which render the image highly unsatisfactory.

Accordingly, the circuit shown and described produces the percentage of direct current coupling for the video signal components, at high brightness and contrast settings to prevent the excess beam current condition mentioned above. However, at lesser contrast settings, the direct current components of the video signal are applied to the cathode ray tube 32 at a significant percentage so that proper color relationship and scene brightness is maintained in the reproduced image.

In a constructed embodiment of the invention successful operation was obtained with component values as follows:

| | |
|---|---|
| Tube **65** | 12 BY7A. |
| B++ | 275 volts. |
| Contrast control **67** | 500 ohms. |
| Brightness control **69** | 1000 ohms (normally this control is set near zero ohms to obtain maximum brightness and maximum D.C. restoration). |
| Resistor **73** | 56,000 ohms. |

In Fig. 2 there is shown a modification of the circuit of Fig. 1 in which the signal is applied from the first video amplifier to the second video amplifier with respect to a reference above ground potential. In this circuit load resistor 44 is connected between the bottom of cathode bias resistor 25 and cathode bypass capacitor 25*a* to the movable arm of variable resistor 69. Video signal components are applied from across resistor 44 through the parallel connection of coil 50 and resistor 51, delay line 53 and the parallel combination of coil 95 and resistor 96 across the input resistor 98. Resistor 98 is connected between the control grid of tube 65 and the arm of variable resistor 69. The junction of variable resistors 67 and 69 is bypassed to ground through capacitor 71 so that the brightness control 69 has a very low impedance at the frequencies of the alternating current components of the video signal. The impedance of variable resistor 67, however, has appreciable effect on the alternating current components, and this permits control of picture contrast by varying the degeneration of them.

As shown in Fig. 2, voltage divider resistor 73 is connected to B++. However, it is also possible to connect this resistor to the anode of tube 65 and this has the effect of improving the direct current restoration and minimizing control interaction. It is also possible to utilized a video peaking capacitor between the cathode of tube 65 and ground in order to establish desirable frequency response in the second video amplifier. However, in the circuits shown in Figs. 1 and 2, the video signal peaking is accomplished in the components connected to the grid and anode of tube 65.

The above described circuits permit the direct current components of the video signal information to be maintained through a two stage video amplifier and applied to a cathode ray tube. Furthermore, the circuit of Fig. 1, as described, provides variation of the percentage direct current coupling which is desirable under the described conditions. It may be seen that the circuit is comparatively simple and requires but few component parts. This circuit can be utilized with a standard power supply providing high positive voltage with respect to ground, or reference point, and no negative bias supply need be provided.

I claim:

1. In a television receiver having a cathode ray picture tube, the combination of circuit means providing a television signal modulated by video signal information, a detector for the television signal to derive video signals therefrom, a first video amplifier circuit including a first electron discharge device having electrodes including a first control grid and a first cathode and a first anode, a direct current conducting input circuit for said first electron discharge device connected to said detector and between said first control grid and cathode for applying the video signals to said first electron discharge device, means for energizing said first anode with respect to a reference point, an output load impedance for said first electron discharge device connected between said input circuit and the point of reference potential, a second video amplifier circuit including a second electron discharge device having a second cathode and a second control grid and a second anode, direct current coupling means connecting said output load impedance between said second control grid and the reference point, first control circuit means including a first variable resistor, second control circuit means including a second variable resistor, means connecting said first and second control circuit means between said second cathode and the reference point, said second control circuit means including a capacitor having negligible impedance at the frequencies of the video signals coupled across said second variable resistor, potential supply means providing a potential positive with respect to the reference point, resistor means connecting said first variable resistor to said potential supply means to provide a bias voltage across said second variable resistor, and output circuit means for said second electron discharge device including a direct current connection from said second anode to the cathode ray tube for applying video signals thereto, said first control circuit means having appreciable impedance at the frequencies of the video signals and said second control circuit means having negligible impedance at the frequencies of the video signals whereby regulation of said first variable resistor provides adjustment of the amplitudes of the video signals and adjustment of said second variable resistor provides adjustment of the direct current conduction through said second electron discharge device.

2. In a television receiver including a cathode ray picture tube and circuit means providing demodulated video signals including alternating current components and direct current components to be applied to the picture tube, a video amplifier including in combination, an electron discharge device having a cathode, a control grid and an anode, potential supply means providing an operating voltage positive with respect to a reference point, first circuit means having appreciable impedance at the frequencies of the video signals and including first variable resistor means, second circuit means including second variable resistor means, means connecting said first and second circuit means in series in the order named between said cathode and the reference point, direct current coupling means for applying the demodulated video signals between said control grid and said second variable resistor means, said second circuit means including a of the video signals and coupled across said second circuit means so that said second circuit means has negligible impedance at the frequencies of the video signals, further resistor means connecting said first varible resistor means to said potential supply means to provide a bias voltage across said second variable resistor means, and direct current coupling output circuit means connecting said anode to the cathode ray picture tube and to said potential supply means, whereby regulation of said first variable resistor provides adjustment of the amplitudes of the video signals and adjustment of said second variable resistor provides adjustment of direct current conduction through said electron discharge device.

3. In a television receiver including a cathode ray picture tube and circuit means providing demodulated video signals including alternating current components and direct current components to be applied to the picture tube, a video amplifier including in combination, an electron discharge device having a cathode, a control grid and an anode, potential supply means providing an operating voltage positive with respect to a reference point, circuit means having appreciable impedance at the frequencies of the alternating current components and including variable resistor means with a movable tap, means connecting said circuit means between said cathode and the refernce point, said circuit means further including additional resistor means so that the resistance of said circuit means provides a voltage drop for bias of said electron discharge device, direct current coupling means for applying the video signals between said control grid and the reference point, a capacitor having negligible impedance at the frequencies of the alternating current components coupled between said movable tap and the reference point so that the portion of said variable resistor means between said movable tap and the reference point is by-passed at the frequencies of the alternating current components, and direct current coupling output circuit means connecting said anode to the cathode ray picture tube and to said potential supply means, whereby regulation of said variable resistor means provides degeneration of the alternating current components and variation in the amplification thereof, and variation in the ratio of the alternating current components to the associated direct current components.

4. In a color television receiver including a cathode ray picture tube and circuit means providing a color television signal modulated by video signal information, the combination of a video detector for the television signal to derive therefrom video signals including alternating current video components and direct current components associated therewith, a video amplifier circuit including a first electron tube having cathode and control grid and an anode, potential supply means for providing an operating voltage positive with respect to a reference point, input circuit means connected between said video detector and said first electron tube to apply the video signals between said control grid and said cathode of said first electron tube, energizing circuit means for said first electron tube including impedance means connected between said input circuit and the reference point and between said anode of said first electron tube and said potential supply means, a second electron tube having a cathode and a control grid and an anode, variable resistor means with a movable tap, means connecting said variable resistor means between said cathode of said second electron tube and the reference point, direct current coupling means connected to said impedance means for applying the video signals to said control grid of said second electron tube, a capacitor having negligible impedance at the frequencies of the alternating current video components coupled between said movable tap and the reference point so that a portion of said variable resistor means between said movable tap and the reference point has negligible impedance at the frequencies of the alternating current video components, and direct current coupling output circuit means connecting said anode of said second electron tube to the cathode ray picture tube and to said potential supply means, whereby regulation of said variable resistor means provides degeneration of the alternating current video components and variation in the ratio of the alternating current video components to the associated direct current components.

5. In a color television receiver including a cathode ray picture tube and circuit means providing demodulated video brightness signals including alternating current components and direct current components to be applied to the picture tube, a video amplifier including in combination, an electron discharge device having a cathode, a control grid and an anode, potential supply means providing an operating voltage positive with respect to a reference point, variable resistor means with a movable tap, means including further resistor means connecting said variable resistor means between said cathode and the reference point to provide bias for said electron discharge device, direct current coupling means for applying the video brightness signals between said control grid and the reference point, a capacitor having negligible impedance at the frequencies of the alternating current components coupled between said movable tap and the reference point so that the portion of said variable resistor means between said movable tap and the reference point is bypassed at the frequencies of the alternating current components, and direct current coupling output circuit means connecting said anode to the cathode ray picture tube and to said potential supply means, whereby regulation of said variable resistor means provides degeneration of the alternating current components and picture contrast control, and variation in the ratio of the alternating current components to the associated direct current components.

6. In a color television receiver including a cathode ray picture tube and circuit means providing a color television signal modulated by video signal information, the combination of a video detector for the television signal to derive therefrom video signals including alternating current video components and direct current components associated therewith, a video amplifier circuit including a first electron tube having cathode and control grid and an anode, potential supply means for providing an operating voltage positive with respect to a reference point, input circuit means connected between said video detector and said first electron tube to apply the video signals between said control grid and said cathode of said first electron tube, energizing circuit means for said first electron tube including impedance means connected between said input circuit and the reference point and between said anode of said first electron tube and said potential supply means, a second electron tube having a cathode and a control grid and an anode, first variable resistor means with a movable tap, second variable resistor means, means connecting said first variable resistor means and said second variable resistor means in the order named between said cathode of said second electron tube and the reference point, direct current coupling means connected to said impedance means for applying the video signals to said control grid of said second electron tube, a capacitor having negligible impedance at the frequencies of the alternating current video components coupled between said movable tap of said first variable resistor means and the reference point so that a portion of said first variable resistor means and all of said second variable resistor means are bypassed at the frequencies of the alternating current video components, and direct current coupling output circuit means connecting said anode of said second electron tube to the cathode ray picture tube and to said potential supply means, whereby regulation of said first variable resistor means provides degeneration of the alternating current video components and control of the signal level of the alternating current video components, and variation of said second variable resistor means provides control of the direct current conduction in said second electron tube and in the cathode ray tube.

References Cited in the file of this patent

UNITED STATES PATENTS 2,819,334 Squires ---------------- Jan. 7, 1958